INVENTOR
AKIRA NIWA
BY
ATTORNEY

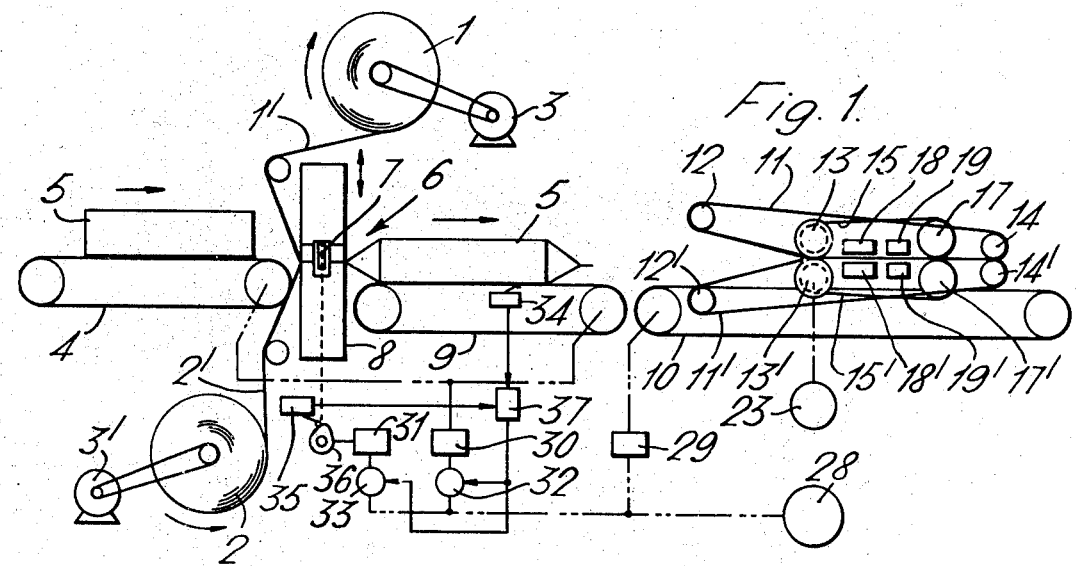

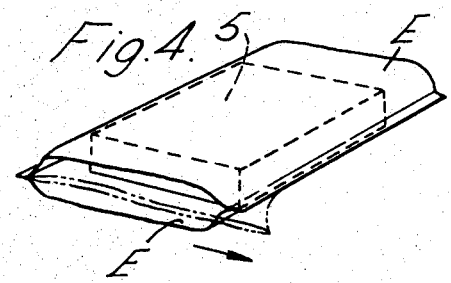
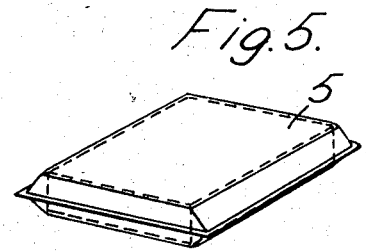
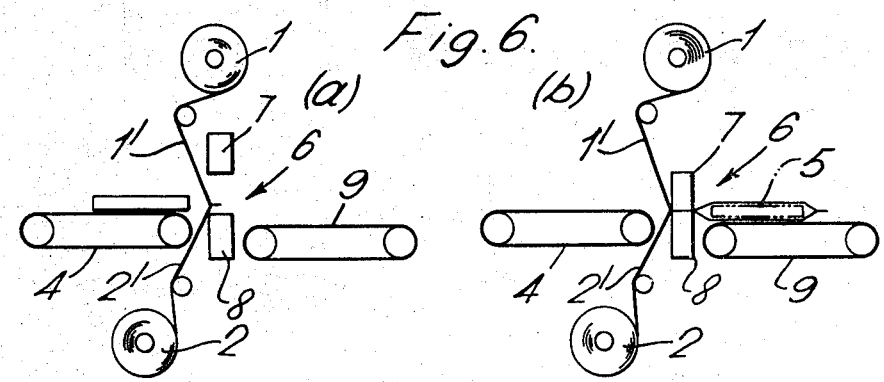
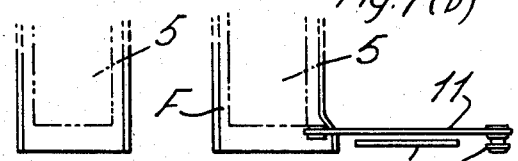
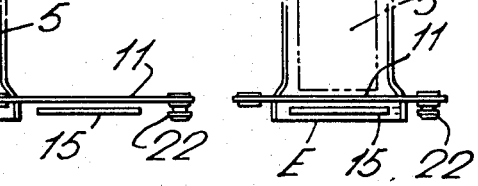
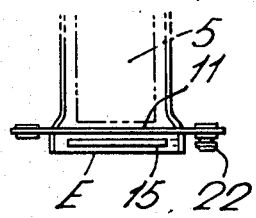
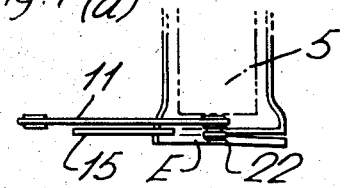

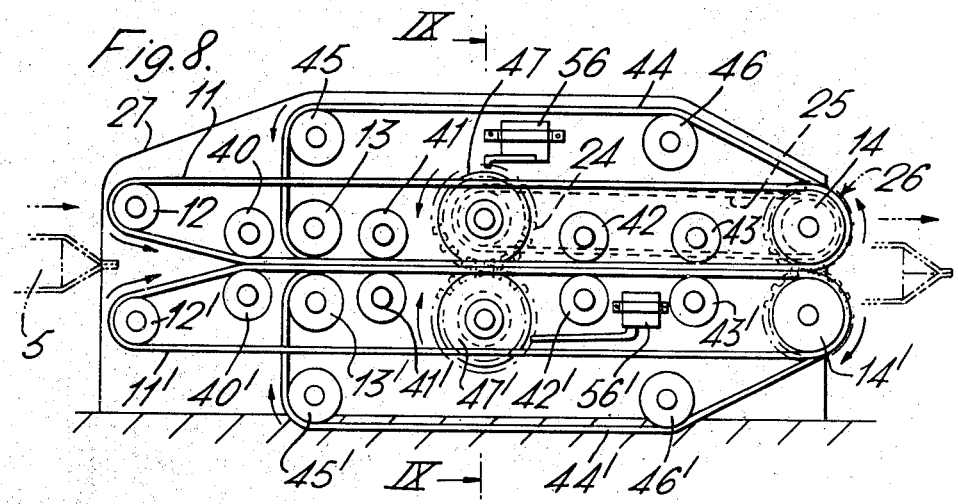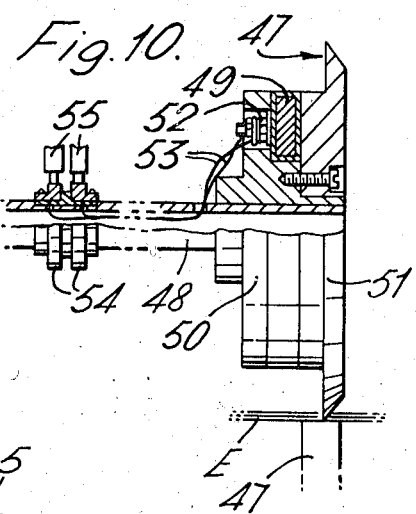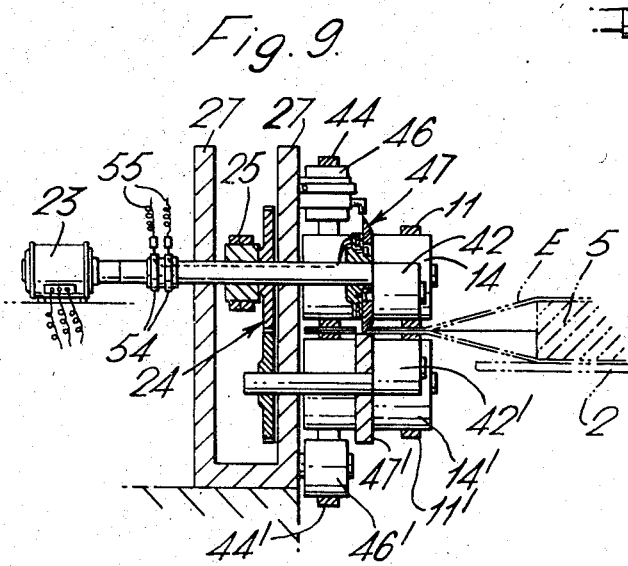

United States Patent Office 3,552,088
Patented Jan. 5, 1971

3,552,088
METHOD OF AND APPARATUS FOR PACKING ARTICLES
Akira Niwa, Kyoto, Japan, assignor to Nishimura Mfg. Co., Ltd., Kyoto, Japan, a corporation of Japan
Filed July 18, 1968, Ser. No. 745,817
Int. Cl. B65b 9/02
U.S. Cl. 53—28                        4 Claims

ABSTRACT OF THE DISCLOSURE

A method of and apparatus for individually and successively packing articles by the use of continuous sheets of heat-sealable packing material. Articles to be packed are succesively placed at a predetermined spacing between a pair of continuous sheets of heat-sealable packing material, and the sheets are sealed and at the same time cut transversely thereof between said articles to provide a series of packages each having its opposite lateral sides not yet sealed. The packages are then successively conveyed in a predetermined direction, and as they are conveyed, the opposite lateral sides of the packing sheets of each package are sealed while they are being pulled farther forward in the direction of movement of the package, or outwardly aslant in the forward direction, whereby occurrence of wrinkles in the finished packages is completely prevented.

---

This invention relates to a method of and apparatus for individually and successively packing articles by the use of continuous sheets of thermo-sealable packing material.

In one known method of packing articles, the articles are successively placed at a mutual spacing between a parallel pair of thermo-sealable packing sheets which are being intermittently fed longitudinally thereof, and the sheets are heat-sealed and simultaneously cut transversely thereof at the front and rear sides of each article and then at the opposite lateral sides thereof to provide a serious of separate packages with the packing sheets sealed at all the four sides of the packed article.

In the following description, the sealing and cutting of the packing sheets at the front and rear sides of the articles as viewed from the direction in which the article is moved, will sometimes be referred to as "transverse sealing" and the seals thus formed, as "transverse seals"; while the sealing of the packing sheets at the opposite lateral sides of the article will sometimes be referred to as "side sealing" and the seals thus formed, as "side seals." Also, the term "to seal" or "sealing" will sometimes be used to connote "to cut" or "cutting" simultaneous with "to seal" or "sealing," especially when "transverse sealing" or "transverse seals" are referred to.

One difficult problem encountered and not yet solved by the above-mentioned prior art packing method is that when side seals are made, wrinkles are apt to be formed in the packing sheets at the lateral edges thereof especially when the article packed is bulky or thick, with resulting deterioration of the appearance of the finished packages.

Accordingly, it is one object of the invention to provide a method of packing articles of the above-mentioned type which solves the problem of wrinkles in the packing sheets by forming side seals on each package the traverse sealing of which has been finished while at the same time pulling the opposite lateral sides of the packing sheets forwardly in the direction in which the package is being conveyed.

Another object of the invention is to provide an article packing method of the type aforesaid which solves the problem of wrinkles by forming side seals on each package the transverse sealing of which has been finished while at the same time pulling the opposite lateral sides of the sheets to be side sealed forwardly and at the same time outward aslant with respect to the direction in which the package is being conveyed.

In accordance with the invention, the opposite lateral sides of the article covering sheets may be pulled in any direction ranging from the forward direction in which the package is being moved to the laterally outward direction perpendicular to the forward direction.

It is also an object of the invention to provide an apparatus suitable for carrying out the above described method.

An additional object of the invention is to provide a disk type side sealer for effectively performing side sealing on the package the transverse sealing of which has been finished.

Other objects, features and advantages of the invention will become apparent from the following description of preferred embodiments thereof with reference to the accompanying drawings, wherein like reference numerals denote like parts and wherein:

FIG. 1 schematically shows the whole arrangement of the apparatus of the invention;

FIG. 2 is a side elevational view, as viewed from inside, of one of the opposed pair of side sealing assemblies having an endless belt type side sealer;

FIG. 3 is a top plan view of FIG. 2;

FIG. 4 is a perspective view of a package the transverse sealing of which has been finished;

FIG. 5 is a perspective view of a finished package;

FIGS. 6a and 6b are schematic side views illustrating different stages of the transverse sealing;

FIGS. 7a–7e are schematic top plan views illustrating different stages of the side sealing;

FIG. 8 is a view similar to FIG. 2 but showing a disk type side sealer in another form of the invention;

FIG. 9 is a vertical section taken on line IX—IX of FIG. 8;

FIG. 10 is an enlarged view, partly in vertical section, of the disk sealer shown in FIGS. 8 and 9;

Figure 11:
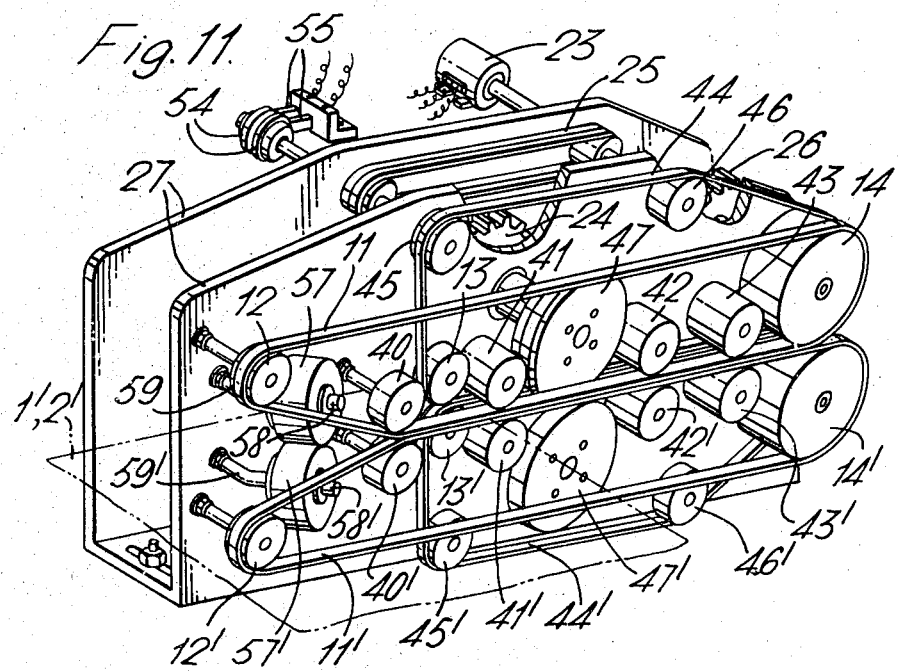
FIG. 11 is a perspective view of one of the opposed pair of side sealing assemblies constructed in accordance with still another embodiment of the invention.

Referring now in detail to the drawings, first to FIG. 1, there are shown a pair of rolls 1 and 2, from which continuous sheets 1' and 2' of thermo-plastic packing material are drawn out by driving the rolls 1 and 2 by means of motors 3 and 3', respectively. The forward ends of the two sheets 1' and 2' are fused together by the transverse sealing performed on the rear edge of a previous package by means of a sealing device 6 to be referred to as the transverse sealer hereinafter. The transverse sealer comprises a pair of jaws 7 and 8. The upper jaw 7 is vertically movable between an open and a closed position relative to the lower jaw 8. While the jaws are open, a conveyer belt 4 brings an article 5 to be packed between the upper and lower sheets 1' and 2', so that the article with its coverting sheets is passed through the then open sealing jaws onto a conveyer belt 9. When the rear edge of the article has passed through the sealer jaws, the passage is detected by any suitable means such as a microswitch 34 so that the jaws are closed to clamp the sheets therebetween at the rear side of the article, thereby forming a transverse seal and simultaneously cutting the sheets along the seal by means of an electrically heated sealing and cutting blade, not shown, provided in one or both of the jaws 7 and 8. The microswitch 34 may be replaced by a photosensor. The construction and operation of the sealer 6 is so well known that no further description thereof will be required.

The package on the conveyer belt 9 has its front and rear sides only sealed as shown in FIG. 4. This package is transferred from the belt 9 onto a third conveyer belt 10, and while the package is being conveyed on the belt 10, side sealing is performed on the opposite lateral sides E of the package. To this end, a pair of side sealing assemblies are provided across the conveyer belt 10 in an opposed relationship. In the drawing, however, only one of the two opposed assemblies is shown. Each side sealing assembly comprises a pair of endless belts 11 and 11' for nipping therebetween one of the opposite lateral sides of the packing sheets of each package on the conveyer belt 10, and a pair of endless sealing belts 15 and 15' arranged in parallel with and outside the nip belts 11 and 11' with a suitable spacing therebetween. The nip belts 11 and 11' run around pulleys 12, 13, 14 and 12', 13', 14', respectively. As the belts 11 and 11' pass around the pulleys 12 and 12' disposed at the side where packages come from the transverse sealer 6, they converge to contact each other at the pulleys 13 and 13', from which the belts 11 and 11' run horizontally keeping contact with each other as far as the pulleys 14 and 14', where they depart and go round back to the pulleys 12 and 12', respectively. The arrangement is such that the horizontally running, contacting portions of the nip belts 11 and 11' are positioned at a height about half the thickness of the article in the package so that the side edge portions E of the package can be properly nipped between the horizontally running, contacting portions of the nip belts 11 and 11'. The height of the contacting portions of the nip belts is variable in accordance with the thickness of articles to be packed.

The upper sealing belt 15 runs around a pair of pulleys 16 and 17; while the lower sealing belt 15' runs around a pair of pulleys 16' and 17'. The lower horizontally running portion of the upper sealing belt 15 contacts the upper horizontally running portion of the lower sealing belts 15', and the contacting line therebetween is positioned at substantially the same level as the horizontal contacting line between the upper and lower nip belts 11 and 11'.

A pair of heaters 18 and 18' are provided within the enclosures of the endless sealing belts 15 and 15' in heat conductive relation thereto, respectively, so that the belts 15 and 15' are heated beside the heaters 18 and 18'. Consequently, as each lateral edge E of a package is slidably gripped between the heated belts 15 and 15', a side seal is formed along the gripped line (FIGS. 3 and 7).

A cooling device provides cool air to be jetted by a fan 20 driven by a motor 21 through a pair of outlets 19 and 19' against the heated belts 15, 15', respectively. A liquid-cooling type may alternatively be employed.

If there is any margin outside the side seals of the package, a rotary disk type cutter 22, 22' may be provided to cut off such a margin (FIGS. 2, 3 and 7).

A torque motor 23 drives the belts 15 and 15' through a gear connection 24, and the nip belts 11 and 11' and the cutter disks 22 and 22' through a belt-and-pulley connection 25 and a gear connection 26.

A frame 27 supports all the component parts of the side sealing assembly as described above.

As can be easily seen from the above description and FIGS. 2, 3 and 7, another side sealing assembly of the same construction is provided across the conveyor belt 10 in an opposed relation to the assembly shown in the figures. The distance between the opposed side sealing assemblies may be variable in accordance with the width of packages to be formed.

The conveyer belts 4 and 9 are driven intermittently while the conveyer belt 10 is driven continuously. The transverse sealer 6 operates intermittently. To effect the mutually related sequential operation of these and other component parts of the mechanism, a drive motor 28 has its drive power transmitted to the belt 10 through a reduction gear 29; to the belts 4 and 9 through an electromagnetic clutch 32 and a reduction gear 30; and to the transverse sealer 6 through an electromagnetic clutch 33 and a reduction gear 31. A cam 36 is ganged with the vertically reciprocating movement of the upper jaw 7 of the sealer 6 to act on a microswitch 35. The previously mentioned microswitch 34 for detecting a package on the belt 9 is positionally changeable in accordance with the length of the articles to be packaged.

Suppose that the upper jaw 7 of the transverse sealer 6 is now in open position. The conveyer belt 4 causes an article 5 to be interposed between the two sheets 1' and 2' the forward or front edges of which are fused together by the previous transverse sealing operation. The article with the packing sheets is then passed through the open sealer 6 while it is being transferred onto the belt 9, until the rear edge of the article has passed through the sealer 6, whereupon the microswitch 34 is actuated, so that the clutch 32 interrupts the drive connection between the motor 28 and the conveyer belts 4 and 9 to stop these belts. At the same time the clutch 33 establishes a drive connection between the motor 28 and the upper jaw 7 of the transverse sealer 6, so that the jaw 7 moves downward to grip, seal and cut the sheets transversely thereof along the rear edge of the article on the then stopped belt 9. Being ganged with the downward movement of the jaw 7, the cam 36 having made one revolution actuates the microswitch 35 thereby to disconnect the clutch 33 and instead connect the clutch 32 to drive the conveyer belts 4 and 9 again. A suitable control circuit 37 is provided to effect the above sequential operation.

The package on the belt 9 thus having its front and rear sides sealed is then transferred onto the third conveyer belt 10, and as it is being conveyed on the belt 10, the lateral sides E of the packing sheets of the package are nipped between the nip belts 11 and 11' of each side sealing assembly. Since the torque motor 23 normally drives the belts 11 and 11' at a higher speed than the conveyer belt 10 driven by the motor 28, the opposite lateral sides of the sheets of the package are pulled farther forward in the direction of movement of the package, so that the upper and lower sheets contact each other at the lateral sides thereof as shown in FIGS. 7b and 4. About this time the pulling force is counterbalanced by the tension of the packing sheets of the package so that the running speed of the belts 11, 11' and 15, 15' becomes substantially equal to that of the conveyer belt 10, and as the package is further moved, side sealing, cooling and cutting of any margin outside the side seal are successively performed as shown in FIGS. 7c–7e.

In the above embodiment, the side sealer is of an endless belt type. A disk type may be more advantageously employed as shown in FIGS. 8 to 10. Here, each side sealing assembly includes an inner pair of nip belts 11 and 11' passing around pulleys 12, 40, 13, 41, 42, 43 and 14, and 12', 40', 13', 41', 42', 43' and 14', respectively; and an inner pair of nip belts 44 and 44' passing around pulleys 45, 13, 41, 42, 43, 14, and 46 and 45', 13', 41', 42', 43', 14' and 46', respectively. The arrangement is such that the horizontally running, contacting portions of the inner nip belts 11 and 11' must be positioned in the same plane as the horizontally running, contacting portions of the outer nip belts 44 and 44'.

A pair of disks 47 and 47' are disposed between the inner and outer pairs of nip belts, with the contacting point of the two disks being substantially in the above-mentioned plane.

As shown in FIG. 10, the upper disk 47 comprises a hollow shaft 48 journaled in the frame 27, an annular heater plate 49, and a pair of disk members 50 and 51 holding the heater plate 49 therebetween and rigidly mounted on the shaft 48 for rotation therewith. The annular heater 49 is provided with a pair of terminals 52 which are connected by a pair of leads 53 passing through the shaft 48 to a pair of slip rings 54 fixed to the shaft 48. A pair of brushes 55 slide on the rings 54 to supply therethrough electric energy to the heater 49 to heat the same and consequently the disk member 51. The disk member 51 has its peripheral edge formed into a circumferential blade 51' which nearly contacts the peripheral surface of the lower disk 47'. If desired, the lower disk 47' may include a similar heater plate to that enclosed in the upper disk 47.

As the package is carried on the conveyer belt 10, the lateral edges E of the sheets covering the article are nipped by the inner and outer nip belts to be pulled forward and then by the disks 47 and 47' to be sealed and at the same time cut along the seal line.

With the disk type side sealer, no separate cutter such as 22, 22' shown in FIG. 2 is required to cut off any margin outside the side seals.

A pair of containers 56 and 56' are mounted on the frame 27 to supply drops of a suitable liquid such as silicone oil onto the peripheries of the cutter disks 47 and 47' to prevent the sealed sheets from sticking to the disks.

Figure 12:
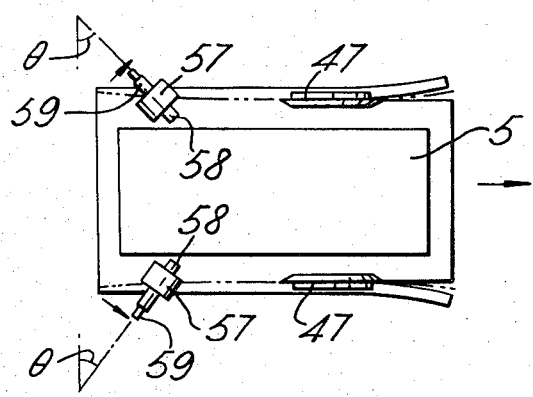
FIG. 12 is a schematic top plan view illustrating the operation of the device of FIG. 11.

In the above embodiments, when side sealing is performed, the lateral sides of the plastic sheets of each package are pulled farther forward in the direction in which the package is being conveyed. More effectively, in addition to this forward pulling, the lateral sides of the package may be pulled forwardly and outwardly aslant with respect to the direction of movement of the package, as shown in FIGS. 11 and 12. Here, a pair of free rollers 57 and 57' contacting each other are provided outside the inner nip belts 11 and 11' and in front of the nip point where the belts 11 and 11' come to contact each other. The rollers 57 and 57' are rigidly mounted on hollow shafts 58 and 58', respectively. A pair of shafts 59 and 59' bent intermediate of their length are fixed to the frame 27 at the inner side thereof so as to be inserted into the hollow shafts 58 and 58', respectively, to rotatably support the latter shafts. The arrangement is such that the contacting point of the rollers 57 and 57' lies in substantially the same plane as that of the horizontally running, contacting portions of the inner and outer nip belts 11, 11' and 44, 44', and that the shafts 58 and 58' frictionally contact the nip belts 11 and 11', respectively, so that the shafts 58, 58' and consequently the free rollers 57 and 57' are rotated as the belts 11 and 11' run.

The angle θ which the axis of rotation of each roller 57, 57' makes with a line perpendicular to the direction of movement of the package may be of any desired value so that the opposite lateral sides of the sheets may be pulled in any desired direction.

With the pulling rollers 57 and 57', even after the running speed of the nip belts is reduced to that of the conveyer belt 10, the rollers 57 and 57' yet operate to pull the lateral sides of the sheets of the package aslant in the forward direction, so that further occurrence of wrinkles can be prevented. Having illustrated and described some preferred embodiments of the invention, it is understood that they are merely representative and that there are many changes and modifications thereof within the scope of the invention as defined in the appended claims.

What I claim is:

1. A method of individually and successively packing articles comprising the steps of feeding a parallel pair of sheets of heat-sealable packing material the outer ends of which are fused together, placing articles to be packed at a predetermined spacing between said sheets so as to be sandwiched thereby, moving each said article with the packing sheets thereon in a predetermined direction, heat sealing and simultaneously cutting said sheets transversely thereof at the rear side of each said article with respect to said predetermined direction, so as to provide a series of packages the transverse sealing of which has been finished, moving each said package in said predetermined direction, pulling the opposite lateral sides of the packing sheets of each said package forwardly in said predetermined direction, simultaneously heat sealing said lateral sides of said packing sheets to form side seals and to complete the sealing of each said package, and pulling the opposite lateral sides of the packing sheets of each said package forwardly and outwardly aslant with respect to said predetermined direction while said side sealing is being performed.

2. The method of claim 1, further including the step of cutting off the margin outside each said side seal.

3. An apparatus for individually and successively packing articles comprising means for feeding a parallel pair of sheets of heat-sealable packing material, means for successively feeding articles to be packed so that said articles may be sandwiched at a predetermined spacing between said sheets, first moving means for moving each said article with its packing sheets in a predetermined direction, first sealing means for heat sealing and simultaneously cutting said packing sheets transversely thereof at the front and rear sides of each said article to provide a package not yet sealed at two opposite lateral sides, second moving means for moving said package in said predetermined direction, means for pulling the opposite unsealed lateral sides of the packing sheets of each said package forwardly in said predetermined direction, second pulling means for pulling said opposite unsealed lateral sides of the packing sheets of each said package forwardly and outwardly aslant with respect to said predetermined direction, and second sealing means for heat sealing said unsealed lateral sides of the packing sheets of each said package to form side seals thereon.

4. The apparatus of claim 3, wherein said second pulling means comprises two pairs of rollers opposed across said second moving means, each said pair of rollers being mounted for mutually frictional rotation about their respective axes making a predetermined acute angle with a line perpendicular to said predetermined direction at the forward side of said perpendicular line.

References Cited

UNITED STATES PATENTS

| | | | |
|---|---|---|---|
| 2,987,107 | 6/1961 | Sylvester et al. | 53—182X |
| 3,355,857 | 12/1967 | Tobey | 53—182 |
| 3,385,028 | 5/1968 | Pierce | 53—373 |
| 3,465,489 | 9/1969 | Monaghan | 53—182X |

THERON E. CONDON, Primary Examiner

E. E. DESMOND, Assistant Examiner

U.S. Cl. X.R.

53—182, 372